(12) United States Patent
Shaoulov et al.

(10) Patent No.: US 7,843,642 B2
(45) Date of Patent: Nov. 30, 2010

(54) SYSTEMS AND METHODS FOR PROVIDING COMPACT ILLUMINATION IN HEAD MOUNTED DISPLAYS

(75) Inventors: Vesselin Shaoulov, Orlando, FL (US); Jannick Rolland, Chuluota, FL (US); Yonggang Ha, Oviedo, FL (US)

(73) Assignee: University of Central Florida Research Foundation, Orlando, FL (US)

( * ) Notice: Subject to any disclaimer, the term of this patent is extended or adjusted under 35 U.S.C. 154(b) by 1245 days.

(21) Appl. No.: 11/417,874

(22) Filed: May 4, 2006

(65) Prior Publication Data
US 2007/0258049 A1    Nov. 8, 2007

(51) Int. Cl.
G02B 27/14    (2006.01)
G02B 5/04    (2006.01)
G03B 21/28    (2006.01)

(52) U.S. Cl. .......................... 359/634; 359/834; 353/81

(58) Field of Classification Search .................. 359/129, 359/496, 618, 631, 629, 634, 636, 638–640, 359/831, 833–834, 630; 353/31, 34, 81; 451/28, 41
See application file for complete search history.

(56) References Cited

U.S. PATENT DOCUMENTS

| 7,163,331 B2 * | 1/2007 | Suzuki et al. | 362/610 |
| 7,192,147 B2 * | 3/2007 | Sakata et al. | 362/19 |
| 7,261,453 B2 * | 8/2007 | Morejon et al. | 362/555 |
| 2002/0144415 A1 * | 10/2002 | Dang et al. | 33/286 |
| 2006/0126686 A1 * | 6/2006 | Suzuki | 372/42 |
| 2007/0024981 A1 * | 2/2007 | Duncan et al. | 359/637 |

* cited by examiner

Primary Examiner—Scott J Sugarman
Assistant Examiner—Dawayne A Pinkney
(74) Attorney, Agent, or Firm—Thomas, Kayden, Horstemeyer & Risley, LLP

(57) ABSTRACT

Disclosed are systems and methods for providing illumination in a head mounted display. In one embodiment a method includes emitting light from a plurality of sources at a plurality of wavelengths and transmitting the light from the plurality of sources to a first device. The method further includes combining the light, utilizing the first device, from the plurality of sources into a combined light signal and creating telecentricity in the combined light signal. The method also includes receiving a telecentric light signal on a display surface. In one embodiment the system includes a light source, a hybrid reflective structure configured as a truncated pyramid and further configured to transmit light emitted by the light source and an optics device configured to create telecentricity in light that was transmitted through the hybrid reflective structure to a display surface.

47 Claims, 10 Drawing Sheets

SYSTEMS AND METHODS FOR PROVIDING COMPACT ILLUMINATION IN HEAD MOUNTED DISPLAYS

RESEARCH OR DEVELOPMENT

The U.S. Government has a paid-up license in this invention and the right in limited circumstances to require the patent owner to license others on reasonable terms as provided for by the terms of UCF Grant 65-01-8126 awarded by the Office of Naval Research of the U.S. through NVIS, Inc.

TECHNICAL FIELD

The present disclosure is generally related to head mounted displays and, more particularly, is related to systems and methods for providing compact illumination in head mounted displays.

BACKGROUND

Various types of head mounted displays are known. An exemplary head mounted display (throughout the following specification the initials "HMD" may be used to mean "head mounted display") includes optics or optical components such as lenses, mirrors or the like, to form an image generated by an image source to an eye or eyes of a person viewing the image (viewer). The image source develops and/or provides an image intended to be viewed and may or may not be part of the HMD. Head mounted display systems are used in the field of virtual reality, in aircraft, for example, as part of a heads-up display system, and by individuals in the field such as, for example, soldiers or other field operatives.

Many prior head mounted display systems use light emitting sources, such as a cathode ray tube, light emitting diode, etc., to create an image. Several disadvantages to such light sources and head mounted displays using them are relatively large size, heavy weight, and cumbersome nature. For example, in some display systems, counterbalancing weights and support systems are needed to support the helmet containing the image source and optics so that the helmet does not strain the head, neck, shoulders, etc. of the user.

In some prior display systems a modulator modulates light from a source and images are created as a function of the modulation. A liquid crystal cell or liquid crystal display device may be such a modulator. A disadvantage of such modulating systems is the reduction in light output due to light blocking and/or absorption occurring in the modulator. To overcome such reduction in brightness, the intensity of the light source is sometimes increased, which draws additional energy, creates heat, requires a larger light source, etc.

Other display systems modulate reflective surfaces using a liquid crystal or cell. These reflective displays require an external light source directed at the display surface. Providing a light source capable of delivering sufficient luminous flux with an acceptable uniformity of the irradiance presents challenges in the context of an HMD. Thus, a need exists in the industry to address the aforementioned deficiencies and inadequacies.

SUMMARY

Embodiments of the present disclosure provide systems and methods for providing illumination in a head mounted display. In one embodiment, a system includes: a plurality of light emitting diodes; a plurality of hybrid reflective structures, configured to transmit light that is received from the plurality of light emitting diodes; a color combining device, configured to receive light transmitted from the plurality of hybrid reflective structures, the color combining device further configured to transmit a combined light signal; and a telecentric optics device configured to receive the combined light signal and transmit a telecentric light signal to a display surface.

In one embodiment, a method includes: emitting light from a plurality of sources at a plurality of wavelengths; transmitting the light from the plurality of sources to a first device; combining the light, utilizing the first device, from the plurality of sources into a combined light signal; creating telecentricity in the combined light signal; and receiving a telecentric light signal on a display surface.

In a further embodiment, a system includes: a light source; a hybrid reflective structure configured as a truncated pyramid and further configured to transmit light emitted by the light source; and an optics device configured to create telecentricity in the light signal that was transmitted through the hybrid reflective structure to a display surface.

Other systems and methods will be or become apparent from the following drawings and detailed description.

BRIEF DESCRIPTION OF THE DRAWINGS

The components in the drawings are not necessarily to scale, emphasis instead being placed upon clearly illustrating the principles of the present disclosure. In the drawings, like reference numerals designate corresponding parts throughout the several views.

DETAILED DESCRIPTION

Reference will now be made to the drawings. While the disclosure will be provided in connection with these drawings, there is no intent to limit the disclosure to the embodiment or embodiments disclosed herein. On the contrary, the intent is to cover all alternatives, modifications, and equivalents.

Figure 1:
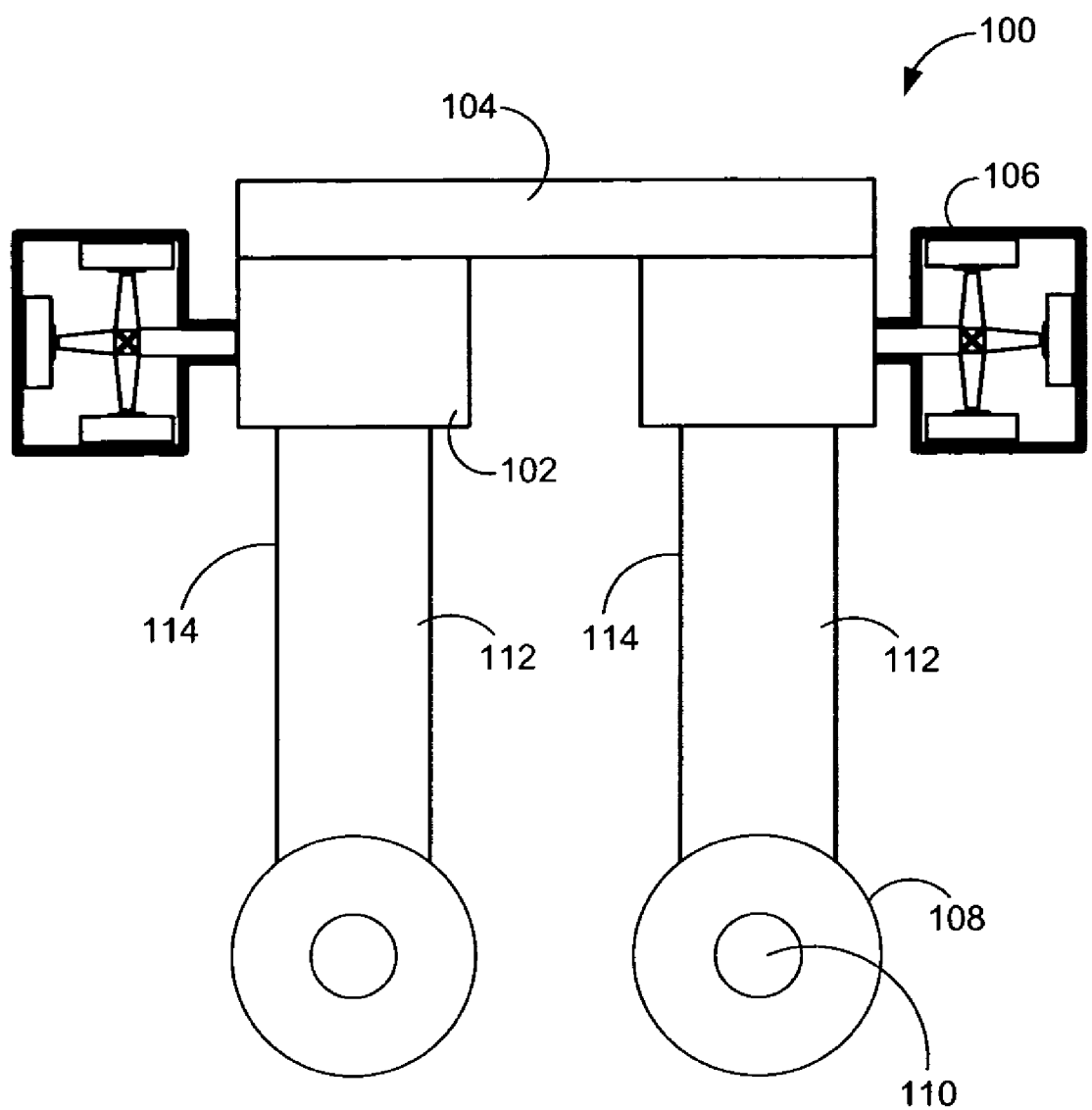
FIG. 1 is a partial schematic view an embodiment of a head mounted display device.

Beginning with FIG. 1, illustrated is a partial schematic view of an embodiment of a head mounted display. The head mounted display 100 includes a structural component 104 configured to maintain the relative position of two optics assemblies 114. Examples of optics assemblies 114 include, but are not limited to, eye pieces or projection optics, among others. Each optics assembly 114 includes an image generation device 102 coupled to an illumination assembly 106. The image generation device 102 is further coupled to focusing optics 112 provided within the assemblies 114 and configured to display an illuminated image through the pupil that is located at the eye.

Figure 2:
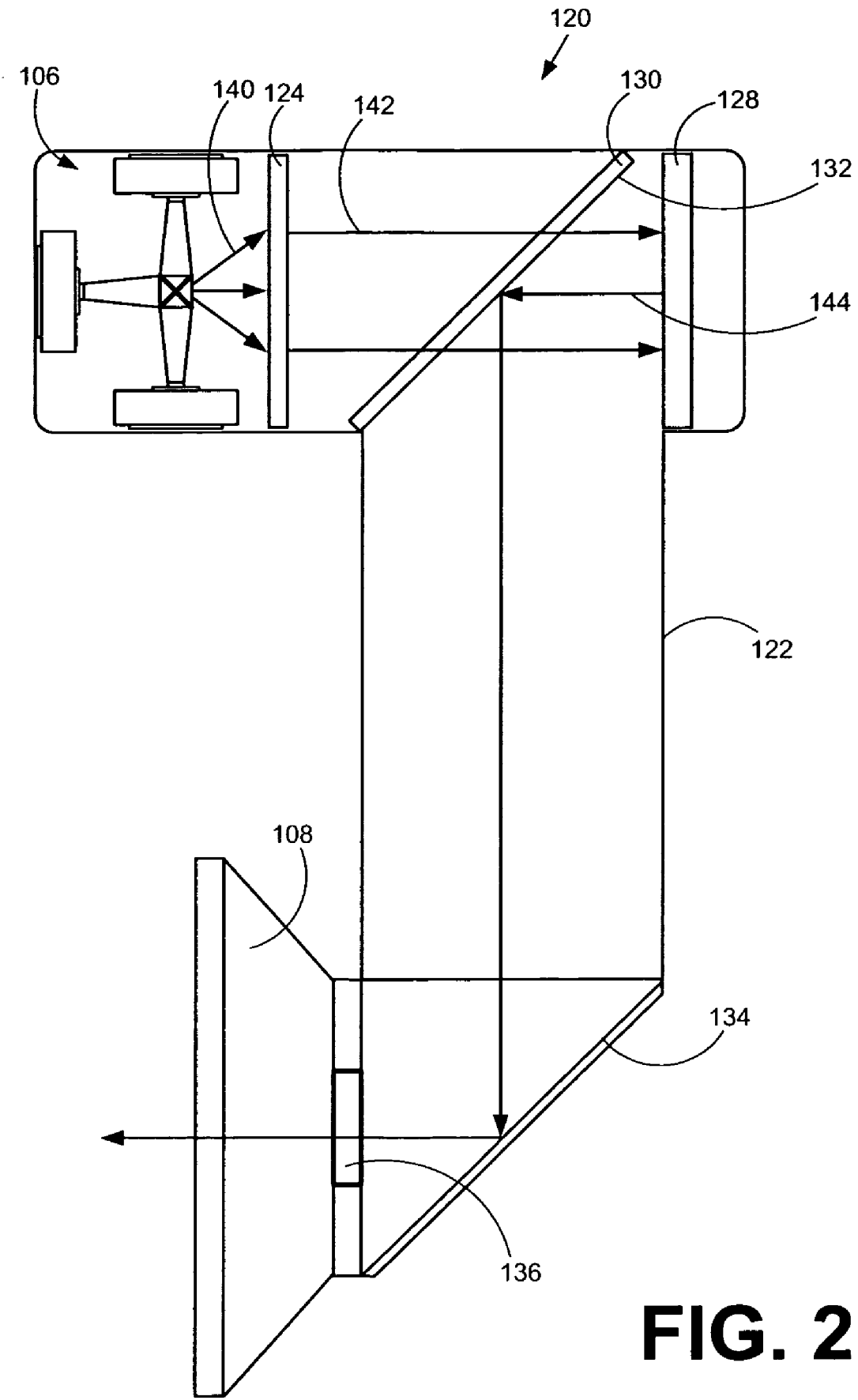
FIG. 2 is a partial cut-away schematic view of an embodiment of an optics assembly.

Reference is now made to FIG. 2, which is a partial side cut-away schematic view of an embodiment of an optics assembly. Examples of an optics assembly include, but are not limited to, an eyepiece or projection optics, among others. The optics assembly 120 includes a housing 122 that supports and secures the components within the optics assembly 120. An illumination assembly 106 transmits a combined light signal 140 through telecentric optics 124. When the light rays from the combined light signal 140 are transmitted from the illumination assembly 106 in a substantially divergent or nonparallel arrangement, the telecentric optics 124 transmits the rays of the combined light signal 140 as collimated light 142, which contains light rays that are substantially parallel to one another. The telecentric light 142 passes through a single-sided reflector 130 and is received by a display device 128. The display device can include a variety of different modulation technologies including but not limited to a liquid crystal display (LCD) technology. For example, the display device can be a liquid crystal on silicone (LCOS) display. The LCOS technology uses a silicone chip coated in liquid crystal. Electronic circuits on the chip open or close the liquid crystal on the chip to expose reflective surfaces. These reflective surfaces turn on or off to create the pixels in the display through a series of lenses. The pixels are illuminated to provide a display based on the selected reflection.

A display light signal 144 is transmitted from the display device 128 and is reflected by a first reflecting surface 132 on the single-sided reflector 130. The light reflected from the first reflecting surface 132 is then reflected by a second reflecting surface 134 through a pupil located at the eye. The arrangement illustrated in FIG. 2 is presented as a mere example and alternative arrangements are possible. For example, the illumination assembly 106 can alternatively be oriented 90° or 180° from the orientation illustrated. Similarly, the orientation of the eye relative to the optics housing can include, for example, an orientation that is 90° or 180° from the orientation illustrated.

Figure 3:
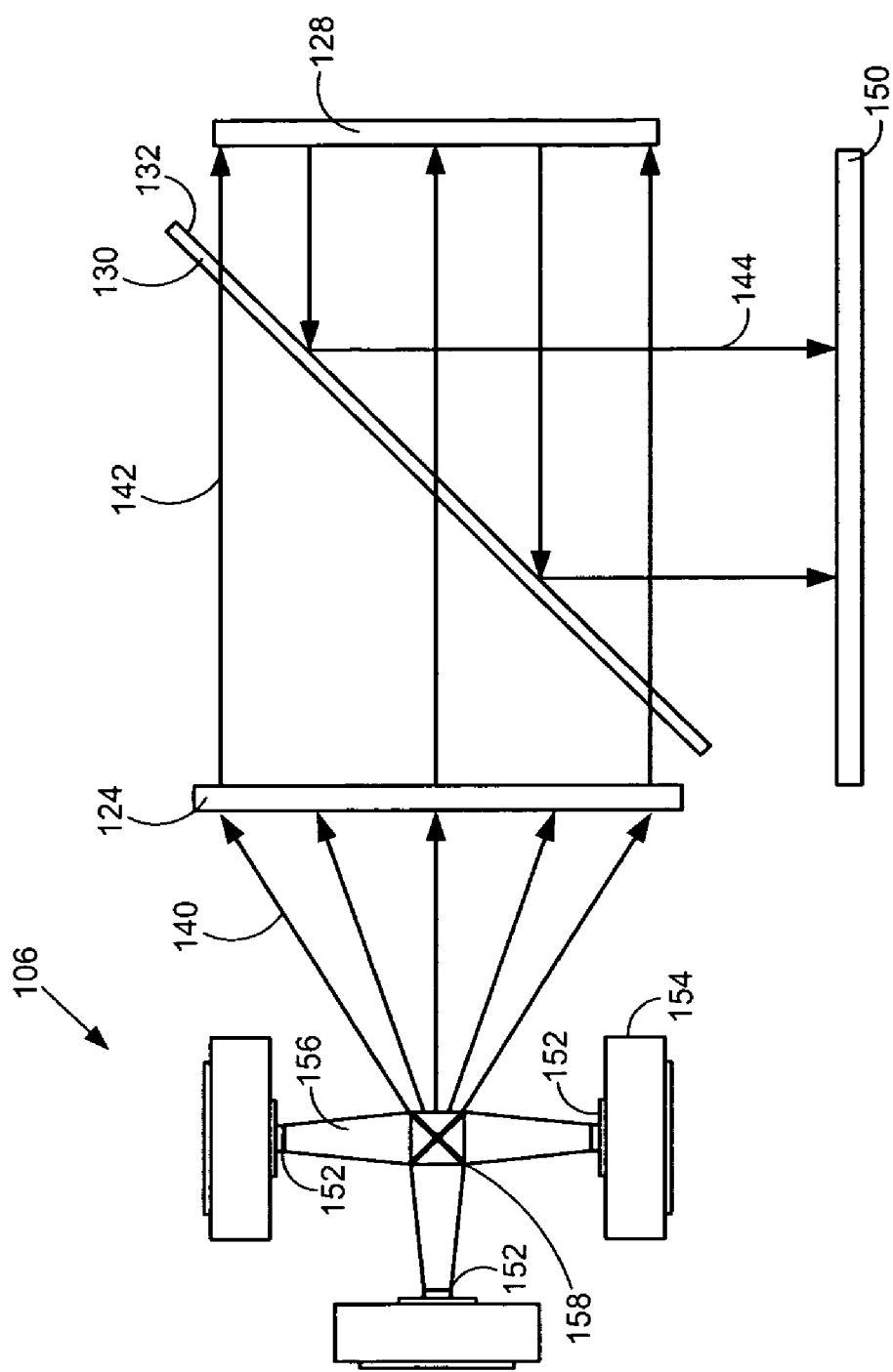
FIG. 3 diagram of a partial side schematic view illustrating functional performance of an embodiment of select optical components in a head mounted display.

Reference is now made to FIG. 3, which is a diagram of a partial side schematic view illustrating functional performance of an embodiment of an optical system within the head mounted display. The optical system includes the illumination assembly 106, telecentric optics 124, a single-sided reflector 130 and the display device 128. The illumination assembly 106 includes light emitting diodes (LEDs) 152 mounted within LED housings 154. In some embodiments, the LED housings 154 further include biasing elements (not shown) configured to urge the LED 152 into reliable engagement with a hybrid reflecting structure 156. Each of the hybrid reflecting structures 156 receives light from an LED 152 and transmits it to a color combining device 158. In this manner, the light originating at each of the LEDs 152 is combined to produce the combined light signal 140. The combined light signal 140 is then transmitted by the telecentric optics 124 as a telecentric light signal and is further directed to the display device 128. The display light signal 144 is reflected from the first reflecting surface 132 of a single-sided reflector 130 to beam splitting optics 150. In some embodiments, the beam splitting optics 150 can be implemented using a polarizing beam splitter. The light signal reflected by the display device 128 can be further modified using additional optical devices.

Figure 4:
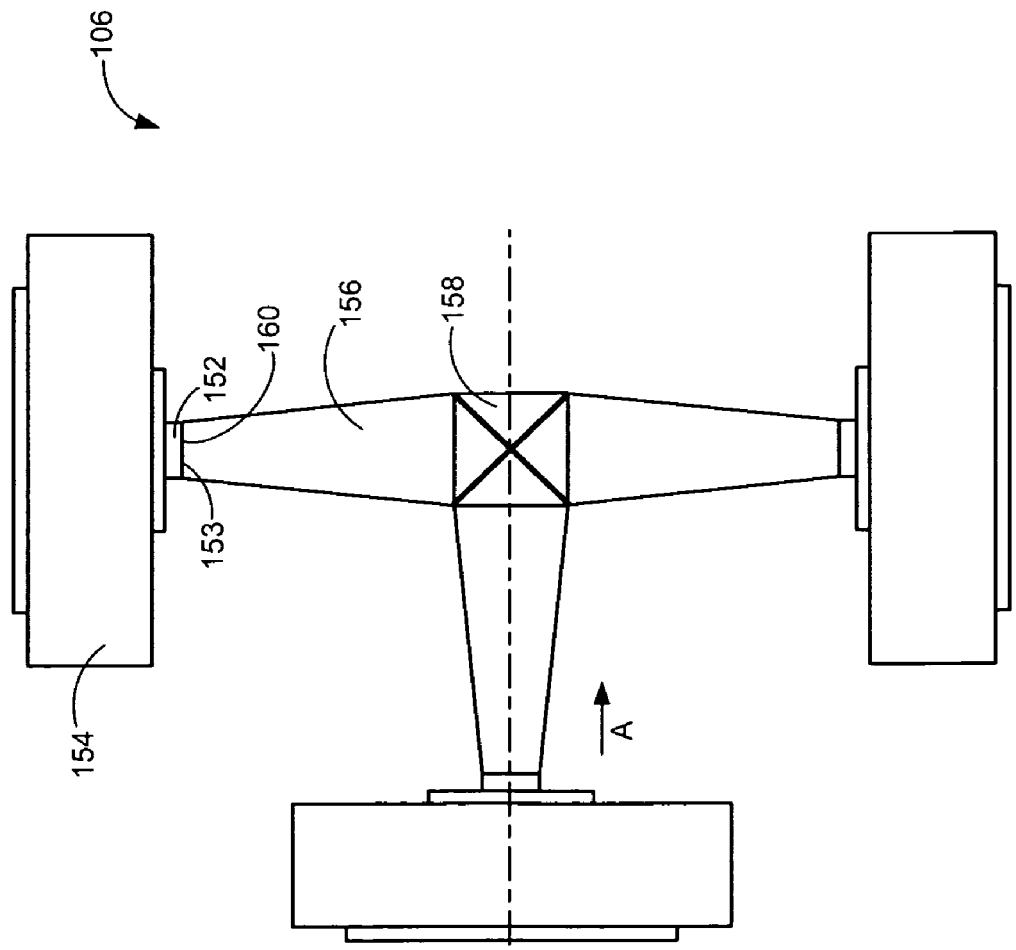
FIG. 4 is schematic view of an embodiment of an illumination assembly.

Reference is now made to FIG. 4, which is a top schematic view of an embodiment of illumination assembly. Illumination assembly 106 includes LEDs 152, mounted within LED housings 154. As discussed above with reference to FIG. 3, an LED housing 154 can include one or more biasing elements (not shown) configured to maintain a constant and reliable engagement between a LED illumination surface 153 and a receiving surface 160 of a hybrid reflective structure 156. In some embodiments each of the LEDs 152 emits light in a different color or wavelength. For example, an arrangement may include a red LED, a green LED, and a blue LED. The light outputs of these different LEDs can also be described in terms of wavelengths. For example, an embodiment can include an LED emitting light in the wavelength between 606 and 648 nanometers, between 509 and 551 nanometers, and between 449 and 491 nanometers. The light from the LEDs 152 is transmitted through the hybrid reflective structure 156 to a color combining device 158. The combined light signal corresponding to the cumulative light received from the hybrid reflective structures 156 is then transmitted from the color combining device 158.

Figure 5:
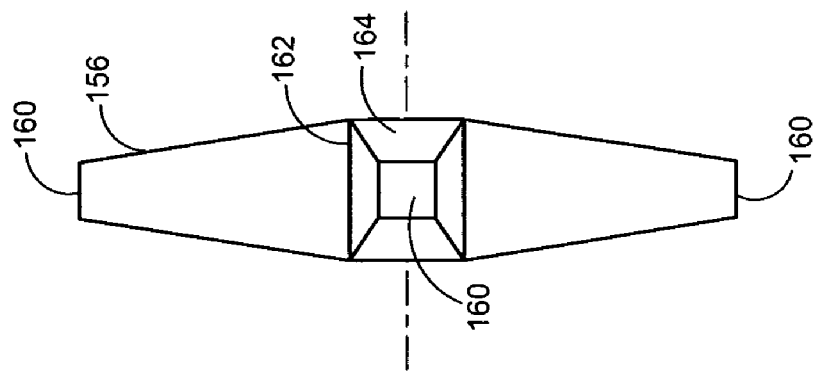
FIG. 5 is a partial orthogonal end schematic view of the illumination assembly of FIG. 4.

Reference is now made to FIG. 5, which is a partial side schematic view of the illumination assembly of FIG. 4. The partial side schematic view includes a view looking in direction A where the LEDs and the corresponding LED housings are not shown. As shown, three hybrid reflective structures 156 are attached to a color combining device (not shown). Each of the hybrid reflective structures 156 includes a receiving surface 160 configured to be coupled with an LED. The hybrid reflective structures 156 also include a transmitting surface 162 configured to be coupled to a receiving surface on the color combining device. The engagement between the hybrid reflective structure 156 and the color combining device 158 can be accomplished using a high optical quality cement or glue. Note that while the receiving surface 160 is substantially square to take advantage of the generally two-dimensional symmetry of light emitted by an LED, the transmitting surface 162 is rectangular to provide a more uniform illumination of a display having a specific aspect ratio.

Figure 6:
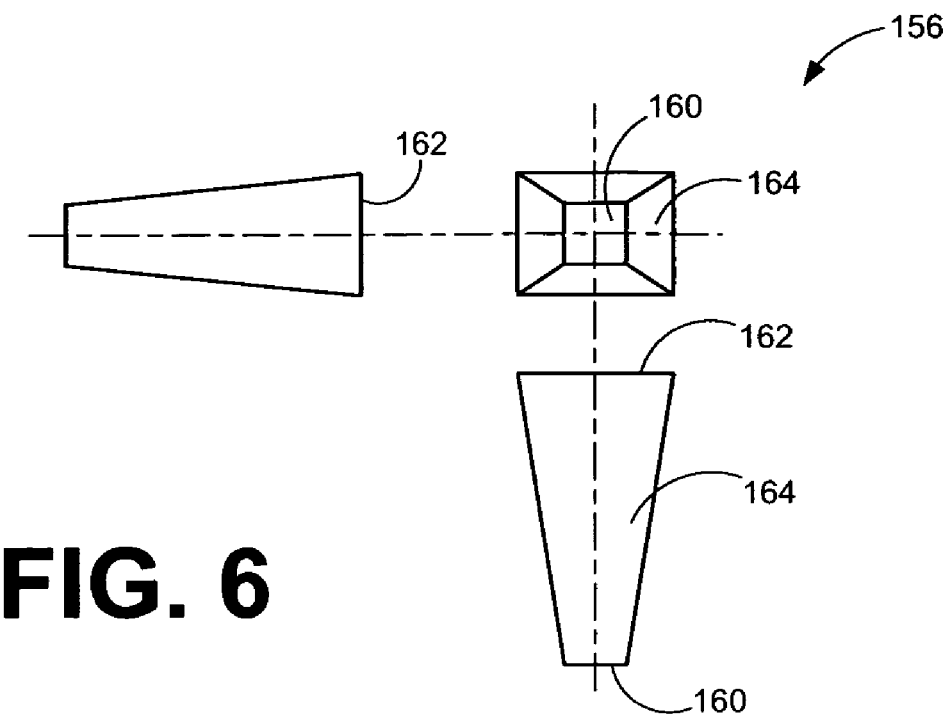
FIG. 6 is an orthogonal schematic view of an embodiment of a hybrid reflective structure as used in an illumination assembly.

Reference is now made to FIG. 6, which is an orthogonal view of an embodiment of a hybrid reflective structure as utilized in an illumination assembly disclosed herein. As illustrated the hybrid reflective structure 156 resembles a four-sided truncated pyramid. Some embodiments include a hybrid reflective structure 156 having four side surfaces 164, a receiving surface 160, and a transmitting surface 162. As discussed above regarding FIG. 5, a receiving surface 160 is configured to receive light from an LED (not shown). The light travels through the hybrid reflective structure 156 and transmitted from a transmitting surface 162 to, for example, a color combining device (not shown).

The hybrid reflective structure can be fabricated of BK7 or other appropriate low absorption glass or plastic and a reflective coating can be chemically applied to the side surfaces 164. Additionally, an antireflection coating can be applied to each of the receiving and transmitting surfaces 160, 162 to minimize Fresnel losses on each side of the pyramid. Exemplary performance of the hybrid reflective structure 156 includes greater than 90% reflectance with less than 10% absorbance, and more preferably 94% reflectance and 6% absorbance. Alternatively, some embodiments can use hybrid reflective structures 156 that are hollow. By way of example, a hybrid reflective structure 156 can be fabricated with a length of 5 mm, a 1 mm by 1 mm receiving surface 160, and a 2 mm by 2.5 mm transmitting surface 162. The 5 mm length can correspond to a beneficial operating distance between the emitting dye of the LED and the receiving surface of the color combining device.

An optical system as disclosed herein that uses the hybrid reflective structure 156 realizes a significant increase in luminous flux captured on the display over a similar system using fiber optics. For example, when silverized fiber is used in lieu of the hybrid reflective structure, the luminous flux captured on the display decreases by a factor of four. One reason for the loss of light is the fact that the silverized fiber essentially preserves the LED's original numerical aperture of approximately 80°, while the hybrid reflective structure decreases the numerical structure. Where a bare optical fiber is used in a total-internal-reflection (TIR) capacity, similar losses are incurred because the fiber will only be capable of capturing the flux emitted by the LED within the approximately 40° numerical aperture, as determined by the critical angle of the fiber. All remaining light will leak through the fiber into the environment.

Figure 7:
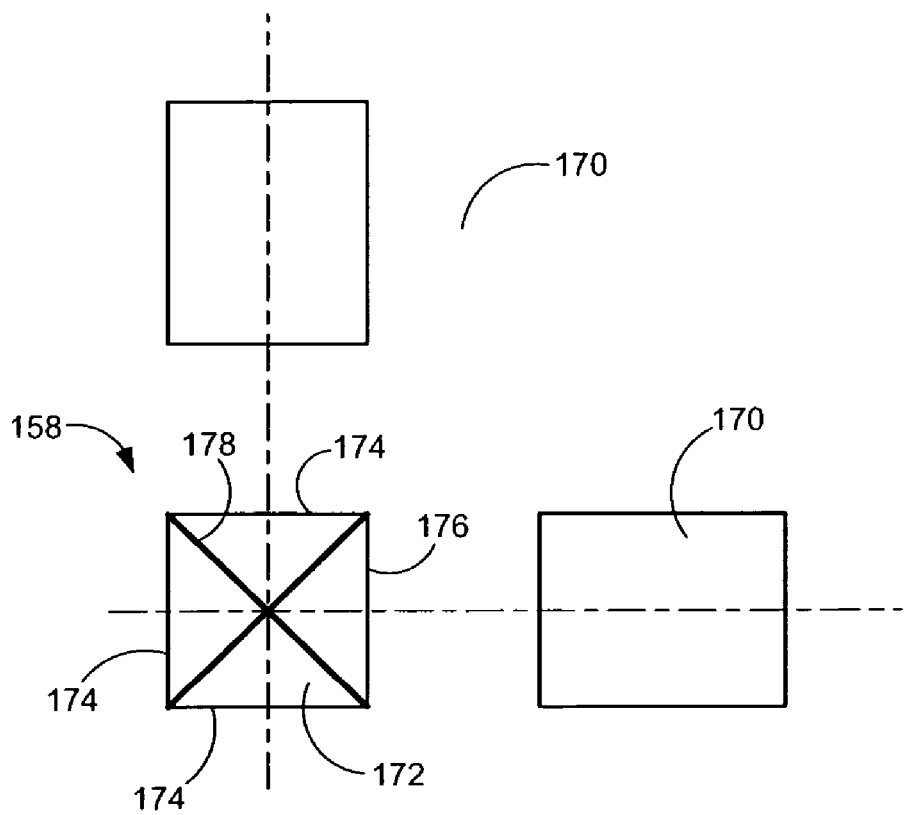
FIG. 7 is an orthogonal schematic view of an embodiment of a color combining device as used in an illumination assembly.

Reference is now made to FIG. 7, which is an orthogonal view of an embodiment of a color combining device as utilized in an illumination assembly disclosed herein. The color combining device 158, also commonly referred to as an X-cube, includes four side surfaces 170 and two end surfaces 172. The end surfaces 172 can be coated with an opaque material to prevent the unwanted transmission of internal light or reception of light from external sources. The four side surfaces 170 include three receiving surfaces 174 and one transmitting surface 176. The receiving surfaces 174 can be configured to receive light from one of the hybrid reflective structures. The transmitting surface 176 can be configured to transmit a combined light signal that corresponds to the accumulation of received light. The color combining device 158 further includes two internal reflective surfaces 178. The internal reflective surfaces 178 are configured as single-sided reflectors, which are capable of transmitting all of the light received from one direction and reflecting substantially all of the light received from another direction. In this manner, each internal reflective surface 178 is oriented to reflect only the light received through a corresponding one of the receiving surfaces 174 while transmitting the light received through the other receiving surfaces 174.

In some embodiments the color combining device 158 can be dimensioned to have receiving and transmitting surfaces 174, 176 that correspond to the dimensions of the transmitting surface of a hybrid reflective structure. Alternative embodiments can include dimensions of the color combining device 158 scaled up to a size larger than that of the hybrid reflective structures without loss in delivered luminous flux. Additionally, an increase in size of the color combining device 158 preserves the irradiance uniformity on the display.

Additionally, some embodiments of the color combining device 158 can include a 4/3 aspect ratio on the input faces. In alternative embodiments, a color combining device 158 can be fabricated with a unity aspect ratio and result in a reduction in luminous flux of less than 0.5%. The irradiance uniformity on the display surface is still preserved with the unity aspect ratio color combining device 158.

Figure 8:
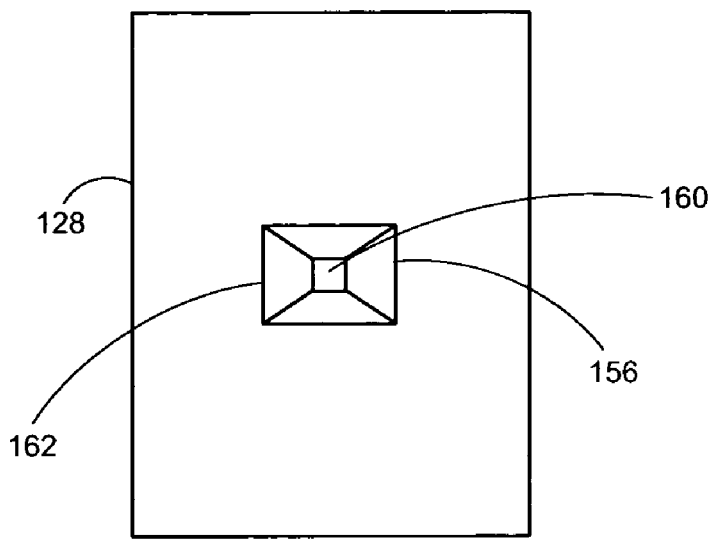
FIG. 8 is a partial end view illustrating an embodiment of a display aspect ratio relative to dimensional characteristics of a hybrid reflective structure.

Reference is now made to FIG. 8, which is a partial end view illustrating an embodiment of a display aspect ratio relative to dimensional characteristics of a hybrid reflective structure. The hybrid reflective structure 156 includes a receiving surface 160 configured to receive light from an LED and a transmitting surface 162 configured to transmit light to the display device 128.

In some embodiments, the hybrid reflective structure 156 includes a receiving surface 160 configured as a square cross-section that matches the size and shape of the LED. Additionally, the transmitting surface 162 is configured with a rectangular cross-section that substantially matches the aspect ratio of a display. For example, if a reflective display has an aspect ratio of 4:3, the hybrid reflective structure 156 has a transmitting surface 162 having the same 4:3 aspect ratio to achieve optimal performance. It is important to note that the longer side of the rectangular transmitting surface 162 is orthogonal to the longer side of the rectangular display device 128.

The hybrid reflective structure 156 combines several functions within a single optics component. For example, the hybrid reflective structure 156 mixes the light emitted by the LED in a manner similar to a tapered light pipe, but in a much more compact structure since only the light emitted at the most extreme angles is mixed. Additionally, the hybrid reflective structure 156 controls the numerical aperture (i.e. the emitting angle) at the transmitting surface 162 to match the numerical aperture of the receiving surface of the beam splitting device. Further, the numerical aperture at the transmitting surface 162 can be configured to match the aspect ratio of the display.

Figure 9:
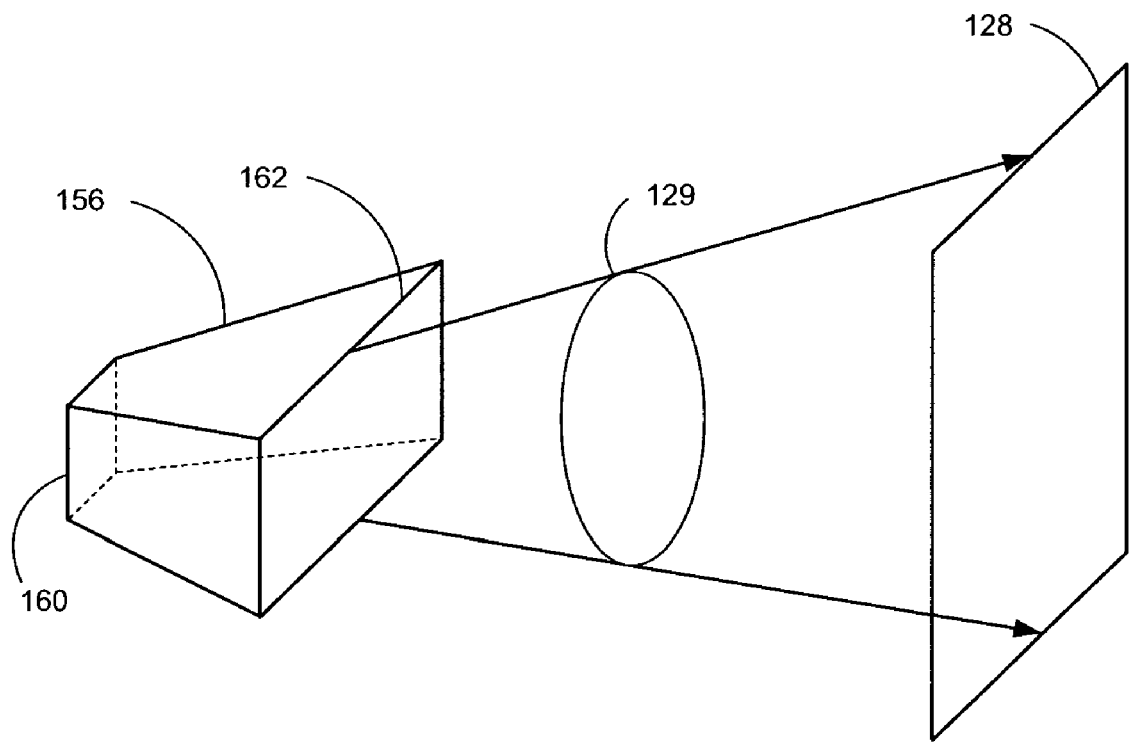
FIG. 9 is a partial perspective view illustrating an embodiment of a display aspect ratio relative to dimensional characteristics of a hybrid reflective structure.

Reference is now made to FIG. 9, which is a perspective view illustrating an embodiment of a display aspect ratio relative to dimensional characteristics of a hybrid reflective structure. The hybrid reflective structure 156 includes a receiving surface 160 and a transmitting surface 162. For the purposes of illustrating the relationship between the transmitting surface and the display device, other intervening optical devices are not illustrated. In this example, the transmitting surface 162 transmits light to the display device 128. Note that the longer side of the display device 128 is orthogonal to the longer side of the transmitting surface 162. The illumination spot 129 is elliptical because of the aspect ratio of the transmitting surface 162.

When a hybrid reflective structure 156 is configured with square cross-sections at both the receiving and transmitting surfaces 160, 162, a circular illumination spot is created on the display surface. The use of transmitting and receiving surfaces 162, 160 having different numerical apertures results in an elliptical illumination spot that can be configured to substantially correspond to the aspect ratio of the display.

Construction of the hybrid reflective structure 156 does not require demanding dimensional tolerances. For example, a similar level of performance can be achieved using a truncated cone having a circular/elliptical configuration instead of a square/rectangular configuration. In the elliptical configuration, the illumination spot 129 will also an elliptical shape. One benefit of this tolerance to shape deviation occurs in a manufacturing process that results in some curvature on the edges of a truncated pyramid. In this case, the performance is not significantly impacted.

Figure 10:
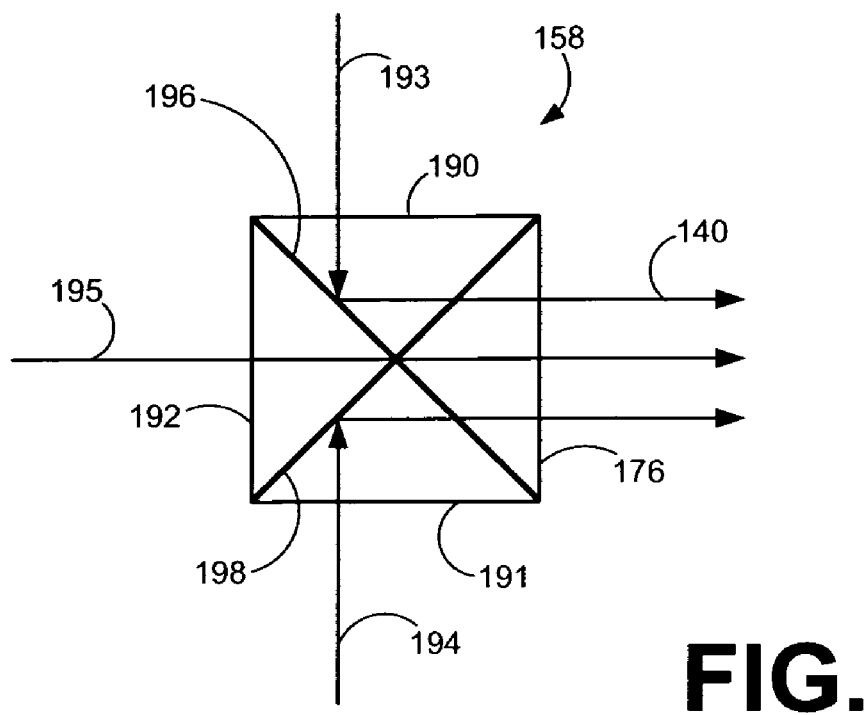
FIG. 10 is side schematic view illustrating performance of an embodiment of a color combining device.

Reference is now made to FIG. 10, which is a side schematic view illustrating performance of an embodiment of a color combining device. The color combining device 158 includes a first receiving surface 190 configured to receive a first source light signal 193. The first source light signal 193 is reflected by a first reflective surface 196 and transmitted through the transmitting surface 176. Similarly, a second receiving surface 191 receives a second source light signal 194, which is subsequently reflected by the second reflective surface 198 and transmitted through the transmitting surface 176. Note that a portion of each of the first and second source light signals 193, 194 is transmitted substantially intact through the non-corresponding reflective surface 198, 196, respectively. For example, the first source light signal 193 is transmitted substantially intact through the second reflective surface 198. Similarly, the second source light signal 194 is transmitted substantially intact through the first reflective surface 196.

Additionally, the third receiving surface 192 is configured to receive a third source light signal 195. Since the third source light signal 195 does not engage the reflective side of the first or second reflective surfaces 196, 198, the third source light signal 195 is transmitted substantially intact through the first and second reflective surfaces 196, 198. In this manner, light from each of the first, second, and third source light signals 193-195 is transmitted through the transmitting surface 196 as a combined light signal 140. Although not illustrated, the side surfaces 170 can be coated with an opaque and/or reflective coating to maximize the amount of light transmitted through the color combining device 158.

Figure 11:
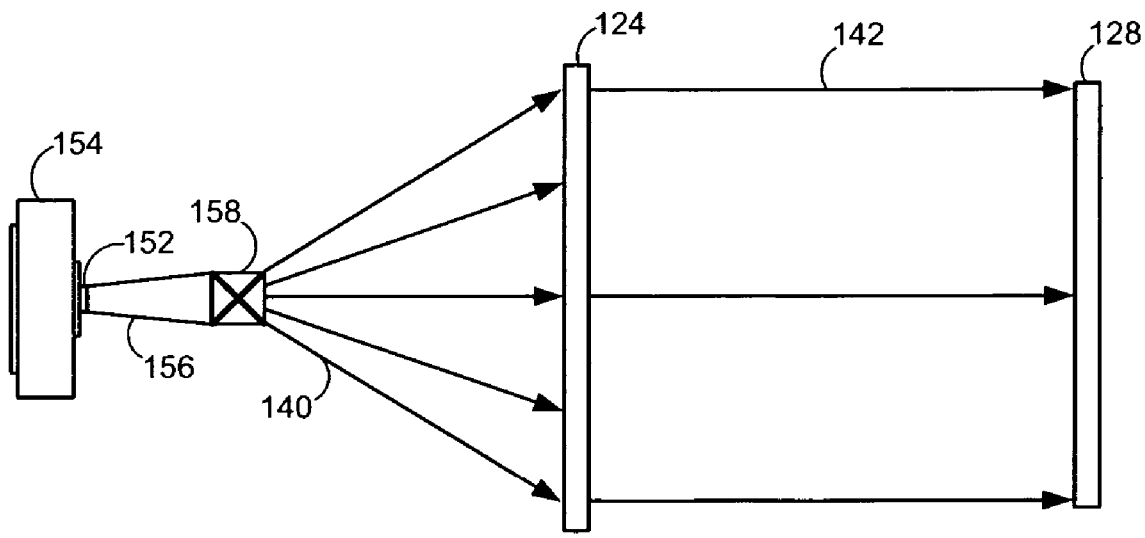
FIG. 11 is a side view illustrating performance of telecentric optics as used in an illumination assembly.

Reference is now made to FIG. 11, which is a side schematic view illustrating performance of telecentric optics as utilized in an illumination assembly disclosed herein. The color combining device 158 receives light transmitted through the hybrid reflective structure 156. The hybrid reflective structure 156 receives the light from an LED 152, which can be housed in an LED housing 154. A combined light signal 140 is transmitted from the color combining device 158 in a series of divergent rays, which are received by the telecentric optics 124. The telecentric optics 124 can include any number of optical components configured to create telecentric light including, for example, a Fresnel lens. A telecentric light signal 142 is transmitted from the telecentric optics 124 onto the display device 128. By transmitting the previously divergent light as telecentric, the light signal received by the display device 128 is more uniform across the surface of the display device 128 and is consistently brighter because of the percentage of the original light source that gets directed to the display device is greater.

In some embodiments, the telecentric optics 124 is focused on the receiving surface on far side of the color combining device 158. Focusing the telecentric optics 124 on the receiving surface on the far side of the color combining device also improves the compactness of the illumination system. Alternative embodiments can focus the telecentric optics 124 on the transmitting surface of the color combining device but exhibit an increased loss in luminous flux without improving the uniformity of irradiance on the display surface. Focusing the telecentric optics 124 beyond the receiving surface on the far side, such as on the LED, yields in an increase in the luminous flux but results in a reduction of the uniformity of irradiance on the display surface.

Figure 12:
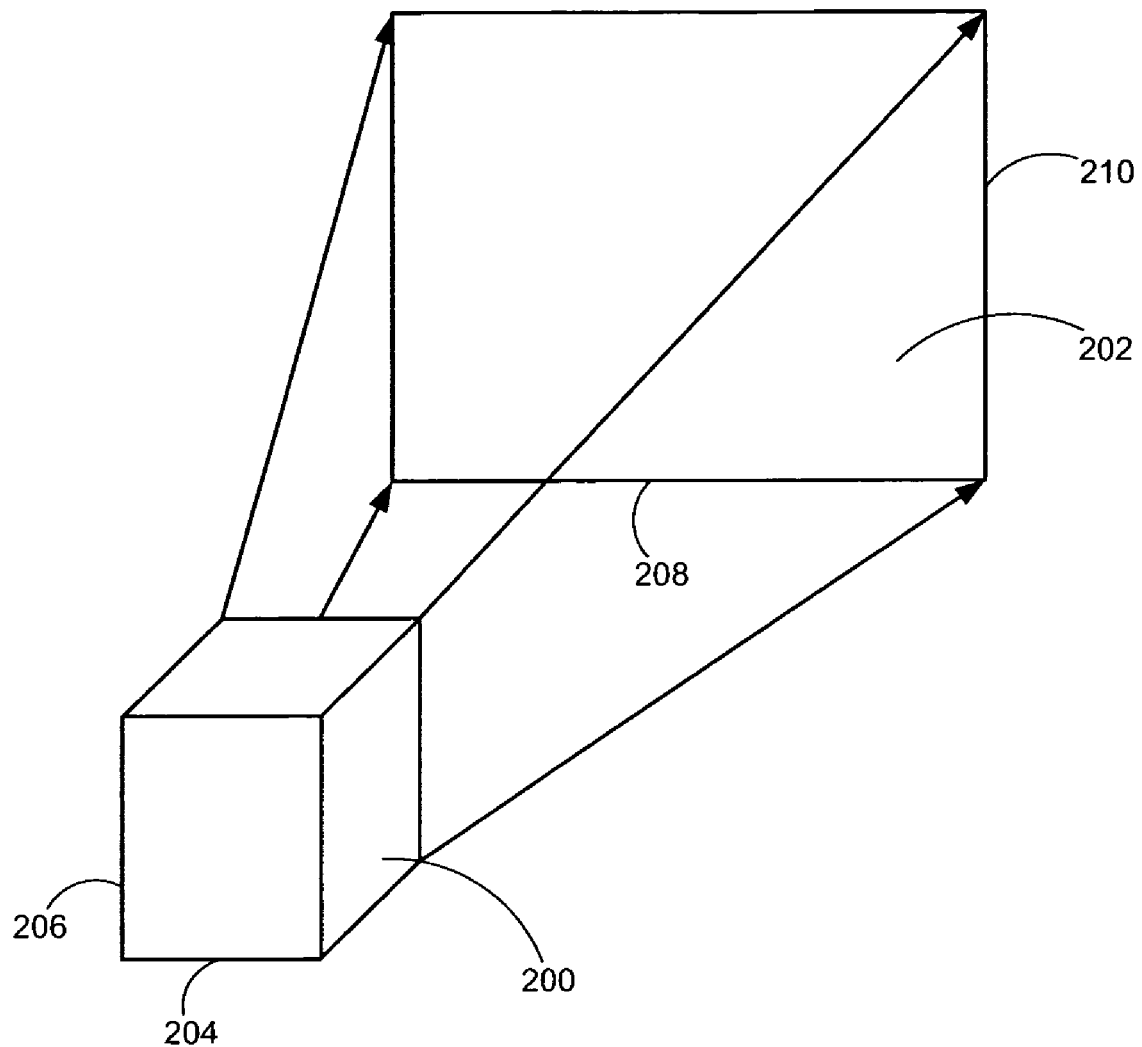
FIG. 12 is a perspective view illustrating a display aspect ratio relative to dimensional characteristics of an optical component.

Reference is now made to FIG. 12, which is a perspective view illustrating a display aspect ratio relative to dimensional characteristics of an optical component. A light transmitting device 200 transmits light to a light receiving surface 202. As the transmitting surface width 204 decreases, a display width 208 increases. Similarly as the transmitting surface height 206 increases, the display height 210 decreases. In this manner, light can more efficiently be directed to a surface having a specific aspect ratio, which is the ratio of a display width 208 to the display height 210, by varying the ratio of the transmitting surface width and height 204, 206. Note, referring back to FIGS. 6 and 7, that the aspect ratio of the transmitting surface 162 of the hybrid reflective structure corresponds to the aspect ratio of the receiving and transmitting surfaces 174, 176 of the color combining device 158. In this manner, the light provided for illuminating a display device having a specific aspect ratio can be configured for efficient and uniform delivery of the light.

Figure 13:
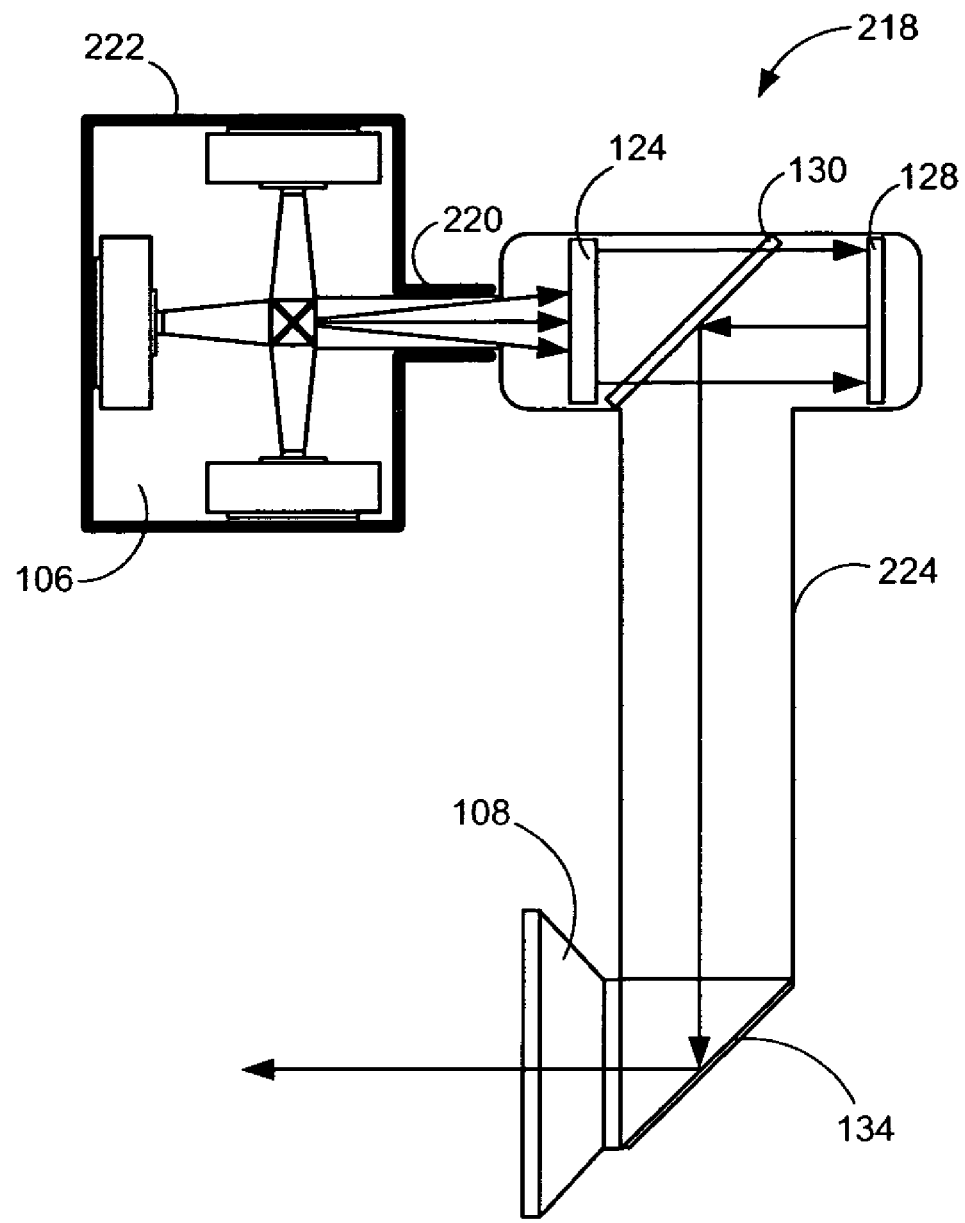
FIG. 13 is a partial schematic cut-away view of another embodiment of an optics assembly.

Reference is now made to FIG. 13, which is a partial side schematic cut-away view of another embodiment of an optics assembly. Examples of optics assemblies 218 include, but are not limited to, eye pieces or projection optics, among others. The optics assembly 218 includes an illumination assembly 106 supported by an illumination assembly structural member 222. An illumination structural member 222 is secured to a light pipe 220, which is configured to transmit the light from the illumination assembly 106 to optical components within the optics housing 224 such as, for example, telecentric optics 124. Tests were performed the system both with and without a light pipe 220. The inclusion of the light pipe 220 resulted in an approximately 2% reduction of luminous flux on the display. The uniformity of the light delivered to the display was preserved in both cases. The functions of the optics assembly 218 beyond the telecentric optics 124 having been previously discussed above regarding FIG. 2. FIG. 13 is not drawn to scale and therefore the relative size of the components is not intended to limit the spirit or scope of the claims herein. Further, the illustration of the optics assembly 218 is arranged to best communicate the function and interaction between the components therein. For example, the orientation of the eye could be altered by 90° in either direction or by 180°. Similarly, the illumination assembly 106 and corresponding illumination assembly structural member 222 can be rotated by 90° in either direction or 180° without altering the functionality disclosed herein. Although not shown, additional optical elements can be utilized to provide further modification of the optical signal as the structure, conditions, or functionality necessitate. For example, imaging optics could be placed between the single-sided reflector 130 and the second reflecting surface 134 to accomplish additional optical manipulation or modification.

Figure 14:
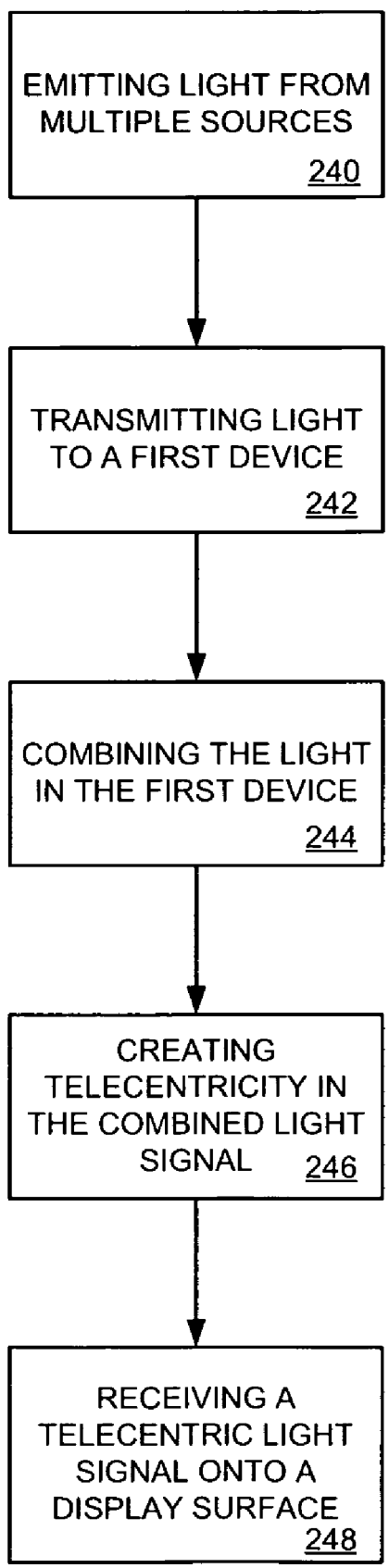
FIG. 14 is a block diagram illustrating an embodiment of a method for providing compact illumination in head mounted displays.

Reference is now made to FIG. 14, which is a block diagram illustrating an embodiment of a method for providing compact illumination in head mounted displays. The method begins with emitting light from multiple sources in block 240. The multiple sources can be, for example, light emitting diodes. In some embodiments, each of the multiple sources can be utilized to emit light in a different color or wavelength. For example, a group of multiple sources could include LEDs emitting red, green, and blue light. Since it may be difficult to obtain high output LEDs in three different colors that have equivalent output in lumens, LED driving circuits can be utilized to match the lumen output of each of the multiple sources.

In the next block, the method includes transmitting light to a first device in block 242. The transmitting can be performed by, for example, hybrid reflective structures, which can be manufactured as truncated pyramid shaped structures having a receiving surface and a transmitting surface. The receiving surface can be configured as the tip of the truncated pyramid and configured to engage one of the multiple light sources. The transmitting surface of the hybrid reflective structure can be attached to a color combining device configured to combine the light as described in block 244. The color combining device can be configured to receive light from each of the multiple sources and produce a single combined light stream. Next, telecentricity is created in the combined light signal in block 246. The telecentricity can be created utilizing any number of optical components, including but not limited to, a Fresnel lens among others. A telecentric light signal is received by a display surface in block 248. In this manner a display surface is illuminated and the illuminated image can then be received by additional optical components for further modification or transmitting.

It should be emphasized that the above-described embodiments of the present disclosure, particularly, any illustrated embodiments, are merely possible examples of implementations. Many variations and modifications may be made to the above-described embodiment(s) of the disclosure without departing substantially from the spirit and principles of the disclosure.

At least the following is claimed:

1. A system for providing illumination in a head mounted display, comprising:
    a plurality of light emitting diodes;
    a color combining device configured to receive light emitted by the light emitting diodes, to combine the received light, and to transmit a combined light signal;
    a hybrid reflective structure positioned between each light emitting diode and the color combining device, each hybrid reflective structure being configured to transmit the light emitted by an adjacent light emitting diode to the color combining device; and
    a telecentric optics device configured to receive the combined light signal, to collimate the combined light signal, and transmit a collimated light signal to a display surface.

2. The system of claim 1, wherein the plurality of light emitting diodes comprise:
    a red light emitting diode;
    a green light emitting diode; and
    a blue light emitting diode.

3. The system of claim 1, wherein each of the plurality of hybrid reflective structures comprises a monolithic structure formed as a truncated pyramid.

4. The system of claim 3, wherein the truncated pyramid comprises a shape selected from the group consisting of: symmetric or anamorphic.

5. The system of claim 1, wherein each of the plurality of hybrid reflective structures comprises a monolithic structure formed as a cone.

6. The system of claim 5, wherein the cone comprises a shape selected from the group consisting of: symmetric or anamorphic.

7. The system of claim 1, wherein each hybrid reflective structure comprises:
    a receiving surface coupled with its adjacent light emitting diode; and
    a transmitting surface coupled to a receiving surface of the color combining device; and
    a plurality of distinct side surfaces that extend between the receiving surface and the transmitting surface.

8. The system of claim 7, wherein each hybrid reflective structure further comprises:
    a reflective coating on the plurality of distinct side surfaces; and
    an anti-reflective coating on the receiving surface.

9. The system of claim 7, wherein the receiving surface is configured in a substantially square geometry and wherein the transmitting surface is configured in a substantially rectangular geometry.

10. The system of claim 7, wherein the receiving surface is preferably dimensioned as a 1 mm by 1 mm square.

11. The system of claim 7, wherein the transmitting surface is preferably dimensioned as a 2 mm by 2.5 mm rectangle.

12. The system of claim 1, wherein the color combining device comprises:
    a plurality of light receiving surfaces configured to receive light from the plurality of hybrid reflective structures;
    a light transmitting surface configured to transmit the combined light signal, wherein the light transmitting surface is substantially parallel to a first light receiving surface of the plurality of light receiving surfaces;
    a first internal reflective surface configured diagonally between a second light receiving surface and a third light receiving surface, wherein the second light receiving surface and the third light receiving surface are each perpendicular to the first light receiving surface; and
    a second internal reflective surface configured diagonally between the second light receiving surface and the third light receiving surface and oriented substantially perpendicular to the first internal reflective surface.

13. The system of claim 12, wherein the first internal reflective surface reflects light from the second light receiving surface to the light transmitting surface and wherein the second internal reflective surface reflects light from the third light receiving surface to the light transmitting surface.

14. The system of claim 12, wherein the first internal reflective surface is configured to reflect a first wavelength of light corresponding to light received by the second receiving surface and wherein the second internal reflective surface is configured to reflect a second wavelength of light corresponding to light received by the third receiving surface.

15. The system of claim 1, wherein the telecentric optics device comprises a Fresnel lens having a focal point between a first light receiving surface of the color combining device and a transmitting surface of the color combining device.

16. The system of claim 1, further comprising a beam splitting optical device configured to split the light signal reflected from the display surface.

17. The system of claim 1, further comprising means for bonding the plurality of hybrid reflective structures to the color combining device.

18. The system of claim 7, wherein the receiving surface of each hybrid reflective structure has a smaller surface area than the transmitting surface.

19. The system of claim 7, wherein the transmitting surface of each hybrid reflective structure is cemented or glued to the color combining device.

20. The system of claim 7, wherein each hybrid reflective structure is shaped as a four-sided truncated pyramid having the receiving surface as a top and the transmitting surface as a base.

21. The system of claim 1, wherein each hybrid reflective structure is composed of a low-absorption glass or plastic.

22. The system of claim 1, wherein each hybrid reflective structure is hollow.

23. The system of claim 1, wherein the telecentric optics device is focused on a receiving surface of the color combining device at which light emitted by one of the light emitting diodes is received.

24. A method for providing illumination in a head mounted display, comprising:
    emitting light from a plurality of sources at a plurality of wavelengths;
    transmitting the light emitted by each light source to a color combining device using a hybrid reflective structure having a receiving surface and an opposed transmitting surface;
    combining the light, using the color combining device, into a combined light signal;
    collimating the combined light signal to create a collimated combined light signal; and
    receiving the collimated combined light signal on a display surface.

25. The method of claim 24, further comprising reflecting a display light signal from the display surface in a substantially nonparallel direction relative to the collimated combined light signal received by the display surface.

26. The method of claim 25, wherein a reflected display signal is received by a beam splitting optical device.

27. The method of claim 24, wherein the plurality of wavelengths comprise:
    a first wavelength in the range between 449 and 491 nanometers;

a second wavelength in the range between 509 and 551 nanometers; and a third wavelength in the range between 606 and 648 nanometers.

28. The method of claim 24, wherein each hybrid reflective structure is configured as a truncated pyramid.

29. The method of claim 24, wherein the hybrid reflective structures further have side surfaces extending from the receiving surface to the transmitting surface, and wherein transmitting the light comprises reflecting the light off of the side surfaces.

30. A system for providing illumination in a head mounted display, comprising:

light sources that emit light;

a color combiner that combines the light emitted by the light sources;

reflective structures configured to transmit the light emitted by the light sources to the color combiner; and an optics device configured to collimate a combined light signal transmitted by the color combiner and transmit the collimated combined light signal to a display surface.

31. The system of claim 30, wherein the light sources comprise light emitting diodes.

32. The system of claim 31, wherein the light emitting diodes comprise:

a red light emitting diode;

a green light emitting diode; and a blue light emitting diode.

33. The system of claim 30, wherein the color combiner comprises:

light receiving surfaces configured to receive light from the reflective structures;

a light transmitting surface configured to transmit the combined light signal;

a first internal reflective surface configured diagonally within the color combiner; and a second internal reflective surface configured diagonally within the color combiner.

34. The system of claim 33, wherein the first internal reflective surface reflects light from a first light receiving surface of the color combiner to the light transmitting surface and wherein the second internal reflective surface reflects light from a second light receiving surface to the light transmitting surface.

35. The system of claim 33, wherein the first internal reflective surface is configured to reflect a first wavelength of light and wherein the second internal reflective surface is configured to reflect a second wavelength of light.

36. The system of claim 30, wherein each reflective structure comprises a monolithic structure formed as a truncated pyramid.

37. The system of claim 30, wherein each reflective structure comprises a monolithic structure formed as a cone.

38. The system of claim 30, wherein each reflective structure comprises:

a receiving surface coupled to an adjacent light source;

a transmitting surface coupled to a receiving surface of the color combiner; and a plurality of distinct side surfaces that extend between the receiving surface of the reflective structure and the transmitting surface of the reflective structure.

39. The system of claim 38, wherein each reflective structure further comprises:

a reflective coating on the plurality of distinct side surfaces; and an anti-reflective coating on the receiving surface of the reflective structure.

40. The system of claim 30, wherein the optics device comprises a telecentric optics device.

41. The system of claim 40, wherein the telecentric optics device comprises a Fresnel lens having a focal point between a light receiving surface of the color combiner and a transmitting surface of the color combiner.

42. The system of claim 30, further comprising a beam splitting optical device configured to split the light signal reflected from the display surface.

43. A system for providing illumination in a head mounted display, comprising:

a plurality of light emitting diodes;

a plurality of hybrid reflective structures configured to transmit light that is received from the plurality of light emitting diodes, each hybrid reflective structure comprising a monolithic structure formed as a truncated pyramid comprising:

a plurality of side surfaces, wherein the each of the plurality of side surfaces is adjacent and joined to two other of the plurality of side surfaces, a receiving surface adjacent the plurality of side surfaces, wherein the receiving surface is configured to be adjacent one of the plurality of light emitting diodes, and a transmitting surface adjacent the plurality of side surfaces, wherein the transmitting surface is substantially parallel to the receiving surface, and wherein the transmitting surface is configured to be adjacent a receiving surface on the color combining device, wherein the receiving surface comprises a first area, wherein the transmitting surface comprises a second area, and wherein the second area is greater than the first area;

a color combining device configured to receive light transmitted from the plurality of hybrid reflective structures, the color combining device further being configured to transmit a combined light signal; and a telecentric optics device configured to receive the combined light signal and transmit a telecentric light signal to a display surface.

44. The system of claim 43, further comprising:

a reflective coating on the plurality of side surfaces; and an anti-reflective coating on the receiving surface.

45. The system of claim 43, wherein the receiving surface is configured in a substantially square geometry and wherein the transmitting surface is configured in a substantially rectangular geometry.

46. The system of claim 43, wherein the receiving surface is preferably dimensioned as a 1 mm by 1 mm square.

47. The system of claim 43, wherein the transmitting surface is preferably dimensioned as a 2 mm by 2.5 mm rectangle.

* * * * *